Nov. 17, 1931.  S. L. GOSSARD  1,832,018
SELF PROPELLED SCOOTER
Filed Dec. 12, 1928
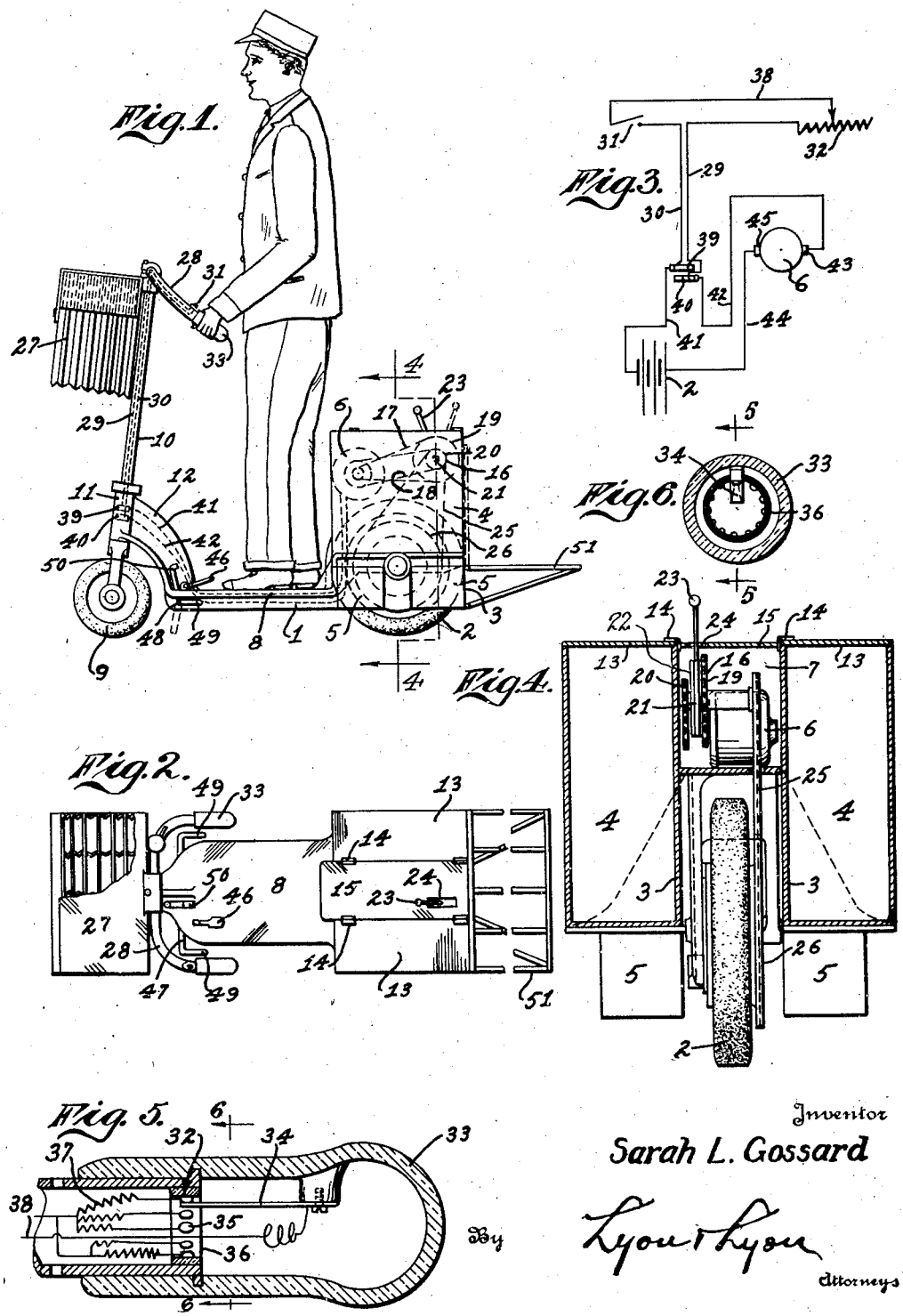
Inventor
Sarah L. Gossard Patented Nov. 17, 1931

1,832,018

UNITED STATES PATENT OFFICE

SARAH L. GOSSARD, OF LOS ANGELES, CALIFORNIA

SELF PROPELLED SCOOTER

Application filed December 12, 1928. Serial No. 325,476.

This invention relates to a scooter or small car which is self-propelled and which is intended to be useful particularly to postmen in delivering letters and small packages and also for general purposes for delivering small bundles, milk or other articles.

It is the present practice for postmen to carry letters and packages to be delivered, in a sack with a strap passing over the postman's shoulder. These sacks are usually large and when filled with letters, they are very heavy. The pressure of the strap on the postman's shoulders is extremely detrimental to health, and due to the weight of the sack, the delivery of mail in this way in warm weather is a very arduous and difficult labor.

The general object of this invention is to provide a scooter of simple construction which would be useful to a postman for carrying and delivering mail.

One of the objects of this invention is to construct the device very simply so that it will be inexpensive to manufacture and so that it can be sold at a relatively low price.

One of the objects of the present invention is to provide means for compactly housing the driving parts of the mechanism and to locate the storage batteries in an advantageous position where they do not interfere with carrying small packages on the scooter and where their weight will assist the traction of the driving wheel of the scooter.

A further object of the invention is to provide simple means for effecting the control of the motor from a point near the steering apparatus and to construct the casing in such a way that its cover can operate as a seat for the postman when the scooter is standing in traffic; also to provide means within convenient reach of the driver for controlling the speed of the drive of the scooter.

Further objects of the invention will appear hereinafter.

The invention consists of novel parts and combination of parts to be described hereinafter, all of which contribute to produce an efficient self-propelled scooter.

A preferred embodiment of the invention is described in the following specification, while the broad scope of the invention is pointed out in the appended claims.

In the drawings:

Figure 1 is a side elevation of a scooter embodying my invention and illustrating the manner in which it is used.

Figure 2 is a plan of the scooter, certain parts being broken away.

Figure 3 is a diagram of the controlling circuit for the motor.

Figure 4 is a vertical section, upon an enlarged scale, taken in the plane of the line 4—4 of Figure 1.

Figure 5 is a longitudinal section through one of the handles of the handle-bar and illustrating details of a rheostat switch controlled by the rotation of the handle. This view is upon an enlarged scale. This view is taken about on the line 5—5 of Figure 6.

Figure 6 is a cross section taken on the line 6—6 of Figure 5.

Before proceeding to a detailed description of the device, it should be stated that in delivering letters, small packages, milk, or other articles, it is necessary where the delivery man is on a vehicle, for him to leave the vehicle and this necessitates constant starting and stopping of the vehicle. For this reason, an ordinary automobile is not satisfactory for the use of a postman, nor is it satisfactory for the use of a milkman. In delivering milk, the use of a horse and wagon has been found far more economical than the use of an automobile. My idea is to provide a small vehicle which is constructed so as to carry articles to be delivered and which is so constructed as to enable the operator or deliveryman to readily get in and out of the vehicle. For this purpose, the scooter type of vehicle is most advantageous and according to my invention, I have constructed such a scooter with means for enabling it to be self-propelled and controlled by a person standing on the scooter.

In its construction, the scooter includes a casing built up on the rear portion of the scooter, a portion of which operates as a seat when necessary for the driver, and which also operates as a housing for the motor and driving mechanism of the scooter. The means for controlling the starting and stopping of the motor is associated with the handlebars of the steering apparatus.

Figure 1 illustrates the preferred embodiment of a scooter constructed in accordance with my invention. This scooter includes a low-slung frame 1, the rear portion of which carries a driving wheel 2 which is preferably enclosed in a housing or casing 3, preferably having two side compartments 4, below which batteries 5 are attached for driving the electric motor 6, which motor is preferably mounted in a motor compartment 7 formed in the casing above the driving wheel.

The driver of the scooter is supposed to stand on a small depressed platform 8 carried on the frame just behind the ground steering wheel 9. This steering wheel is carried at the lower end of a steering column 10 rotatably mounted in a bearing 11, carried on a yoke 12 that extends upwardly from and forms the forward end of the frame. The side compartments 4 may be provided with covers or lids 13 attached by means of hinges 14. The forward end of the cover wall 15 of the casing is capable of operating as a seat portion upon which the driver of the scooter may seat himself when waiting in traffic.

Between the motor and the driving wheel, I provide a chain speed transmission mechanism indicated at 16. This mechanism may be of any suitable construction and its details form no part of this invention. However, the device illustrated involves the use of two sprocket chains 17 and 18, the former of which is for low speed drive and the latter of which is for high speed drive.

The chain 17 passes over a relatively large sprocket wheel 19 on the shaft of the transmission mechanism, and the sprocket chain 18 passes over a relatively small sprocket wheel 20. Between these two sprocket wheels, on the shaft 21 of the transmission mechanism, a clutch 22 is provided, controlled by a lever 23. In one position of this lever, the clutch connects the shaft 21 with one of the sprocket wheels, and in the other position, as indicated by the dotted lines in Figure 1, the clutch connects the shaft 21 with the other sprocket wheel. The lever 23 extends out through the wall of the casing, preferably through the cover wall 15 for which purpose the cover wall is provided with a slot 24. This slot is located so that the lever 23 will not be in the way of the driver when he seats himself upon the seat portion 15 of the casing. The sprocket chain 25 extends down from the shaft 21 and runs over a large sprocket wheel 26 secured to the driving wheel 2.

The upper end of the steering post 10 is provided with means such as the carrier 27, for carrying letters or other small articles and if desired, an open basket can be provided at this point in which the postman's regular mail bag can be deposited. This arrangement would enable the postman, if he desired to do so, to carry all of his mail in the sack with him when he leaves the scooter.

I provide means for controlling the starting of the motor from a point on the handlebar 28 that is attached to the upper end of the steering post 10. For this purpose, I provide a circuit including conductors 29 and 30 (see Figure 3), which extend up the steering post which is of tubular form, the conductor 30 extending into the left handlebar to connect with push button switch 31. The other conductor 29, extends into the right hand handle-bar and connects with a rheostat switch 32. This switch is a starting switch and controls the flow of current through different resistances (see Figure 5). In this figure, 9 illustrates a simple type of switch in which the handle 33 of the handle-bar is rotatably mounted on the end of the handle-bar, that is to say, it swivels on a handle-bar and it carries a spring contact 34 that rides over contact buttons 35 provided in an insulating band or collar 36, mounted in the end of the handle-bar. These buttons 35 are connected by resistances 37, with a wire 38, so that by controlling these two switches, the motor can be started and driven at any desired speed.

The conductors 29 and 30 connect respectively with two slip rings 39 and 40 mounted in the bearing 11 and connected with conductors 41 and 42, the latter of which leads to the batteries 5, the former of which leads to one of the terminals 43 of the motor 6. Another wire 44 connects the other terminal 45 of the motor with the other side of the battery. A brake lever 46 is provided in the form of a pedal. This pedal connects by means, not illustrated, with a brake drum on the rear driving wheel.

It is obvious that, if desired, the scooter could be constructed with two rear wheels which would enable the scooter to support itself in upright position. I prefer, however, to provide it with a single rear driving wheel and provide other suitable means for holding the scooter upright, when this is necessary. For this purpose, I provide a cross-bar 47 which is mounted to rotate at 48 in the frame below the platform 8. Each end of this cross-bar is formed with an arm 49 which may swing down to the position indicated in dotted lines in Figure 1, so as to engage the pavement or ground to hold the device upright. The cross-bar 47 may be operated by a small foot lever or pedal 50 that extends up from it.

If desired, the device may be provided with an additional means for carrying articles to be delivered. This means is preferably the form of a folding frame 51, of any suitable construction, secured to the rear wall of the casing 3 and adapted to fold up against the rear wall when not in use, as indicated by the dotted lines in Figure 1. Figure 1 shows the frame in full lines in its extended position.

I claim:

1. In a self-propelled scooter, the combination of a frame, a steering post carrying a ground steering wheel mounted at the front of the frame and having a handle-bar for steering the same, means on the forward side of the steering post for supporting articles to be delivered, a driving-wheel rotatably supported on the rear portion of the frame, a casing over the driving wheel with compartments therein and having a cover wall, storage batteries located on opposite sides of the driving-wheel, an electric motor supported in the casing over the wheel, clutch means for driving the driving-wheel from the motor with a controlling lever therefor projecting through the said cover wall of said casing, and means on the handle-bar for controlling the motor.

2. In a self-propelled scooter, the combination of a frame, a steering post carrying a ground steering wheel mounted at the front of the frame and having a handle-bar for steering the same, means on the forward side of the steering post for supporting articles to be delivered, a driving-wheel rotatably supported on the rear portion of the frame, a depressed platform for the driver to stand upon between the casing and the handle-bar, a casing over the driving wheel having a flat top forming a seat for the driver, said casing having compartments therein, storage batteries located below two of said compartments on opposite sides of the driving-wheel, an electric motor supported in the casing over the wheel, and clutch means for driving the driving-wheel from the motor with a controlling lever therefor projecting through the said flat top wall of said casing.

3. In a self-propelled scooter, the combination of a frame, a steering post carrying a ground steering wheel mounted at the front of the frame and having a handle-bar for steering the same, handles for the handle-bar with switches within the same operatable by the hand while grasping the handle-bar, a driving wheel rotatably supported on the rear portion of the frame, a casing over the driving wheel, an electric motor supported in the casing, with means for driving the driving wheel from the motor, a circuit connected with the motor having conductors passing to the said switches and controlled by the same.

4. In a self-propelled scooter, the combination of a pair of ground wheels including a single driving wheel at the rear and a steering wheel at the front, a frame carrying said wheels and having a depressed platform between the same for the driver of the scooter to stand upon, a handle-bar connected with the steering wheel for steering the scooter, a casing supported on the said frame over the driving wheel and having a pair of side compartments extending down alongside of the said driving wheel at each side to receive articles to be carried on the scooter, an electric motor disposed within the casing over the wheel and between the said compartments, and storage batteries carried on each side of the wheel respectively below the said side compartments, for driving the motor.

5. In a self-propelled scooter, the combination of a pair of ground wheels including a driving wheel at the rear and a steering wheel at the front, a frame carrying said wheels and having a depressed platform between the same for the driver of the scooter to stand upon, a handle-bar connected with the steering wheel for steering the scooter, a casing supported on the said frame over the driving wheel and having a pair of side compartments extending down alongside of the said driving wheel at each side to receive articles to be carried on the scooter, an electric motor disposed within the casing over the wheel and between the said compartments, storage batteries carried on each side of the wheel respectively below the said side compartments, driving means including a hand-controlled clutch between the motor and the driving wheel, and a driving connection connecting the batteries with the motor including a switch, with starting coils mounted in the handle-bar, said handle-bar having a swiveled hand-hold cooperating with the starting coils to close the driving circuit therethrough in succession.

Signed at Los Angeles, California, this 5th day of December, 1928.

SARAH L. GOSSARD.